(12) United States Patent
Post et al.

(10) Patent No.: US 7,373,446 B2
(45) Date of Patent: May 13, 2008

(54) METHOD AND SYSTEM FOR DYNAMICALLY PATCHING AN OPERATING SYSTEM'S INTERRUPT MECHANISM

(75) Inventors: Bradley S. Post, San Francisco, CA (US); Rene A. Vega, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 10/982,081

(22) Filed: Nov. 5, 2004

(65) Prior Publication Data

US 2006/0101181 A1     May 11, 2006

(51) Int. Cl.
G06F 13/24     (2006.01)
G06F 9/455     (2006.01)

(52) U.S. Cl. .................... 710/261; 710/266; 718/1
(58) Field of Classification Search ............ 710/260, 710/261, 266, 267, 269; 718/1
See application file for complete search history.

(56) References Cited

U.S. PATENT DOCUMENTS

2003/0051087 A1* 3/2003 Corrigan et al. ............ 710/260
2004/0117532 A1* 6/2004 Bennett et al. .............. 710/260
2005/0076155 A1* 4/2005 Lowell ........................ 710/1
2005/0125582 A1* 6/2005 Tu et al. ..................... 710/260
2006/0064528 A1* 3/2006 Soltis et al. ................. 710/260

* cited by examiner

Primary Examiner—Mark H. Rinehart
Assistant Examiner—Thomas J Cleary
(74) Attorney, Agent, or Firm—Workman Nydegger

(57) ABSTRACT

In a virtual computing machine, a system and method that dynamically patches the interrupt mechanism (in interrupt vector space) of a host computing architecture with guest mode software. Significant increases in performance are achieved without depending on the host code. A patching mechanism evaluates the operating system version, processor, and code to be patched. If patchable, low-level interfaces are created dynamically; a dispatcher is written into an unused location in vector space, and instructions copied from each interrupt vector to be patched to a guest interrupt vector. For an interrupt, the new, patched instructions branch to the dispatcher, which then branches to the appropriate patched interrupt guest code. If the processor is operating as a virtual machine, the guest interrupt code handles the interrupt, otherwise the original copied instructions are replayed, followed by execution at the original host instruction in vector space that exists after the copied and patched instructions.

44 Claims, 5 Drawing Sheets

METHOD AND SYSTEM FOR DYNAMICALLY PATCHING AN OPERATING SYSTEM'S INTERRUPT MECHANISM

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computing systems, and more particularly to virtual computing in a host computer system.

BACKGROUND

The concept of virtual computing is based on software that allows a user to run multiple operating systems simultaneously on one physical computing device. As a result, application programs written for one platform can be run on a different type of computing device. Thus, for example, Microsoft Corporation's "Virtual PC for Mac" software is a Macintosh application program that emulates a Windows®-based personal computer and allows Windows®-based programs to be run under the Macintosh Operating system and underlying hardware. Running with the device's regular operating system is often referred to as running in host mode, while running with the software that performs the emulation is often referred to as running in guest mode.

However, a significant problem with virtual computing is the noticeably slow performance that exists when emulating one platform on another. Contemporary emulation solutions have heretofore depended on the manufacturer of the computing device to provide interfaces in the host operating system code to facilitate virtual computing. In a number of situations, these interfaces are responsible for the slow performance, (the system may take many such exceptions per second that require usage of the interfaces, resulting in the system being anywhere from three to twenty times too slow to meet performance objectives), but there is no straightforward way for the manufacturer to improve the interfaces. What is needed when running virtual machines is a way to lessen the dependency on the device manufacturer's host operating system code while achieving significant performance gains in the guest operating system.

SUMMARY OF THE INVENTION

Briefly, the present invention is directed towards a system and method that dynamically patch the interrupt mechanism of a host computing architecture with optimized, dynamically-generated guest mode software, and thereby avoid needing to have the guest mode code use the host operating system's interfaces for interrupt handling. Significant increases in performance are achieved.

More particularly, computer system architectures, such as those having the PowerPC microprocessor, provide an interrupt mechanism to allow the processor to change state as a result of external signals, errors, or unusual conditions arising from the execution of instructions. This interrupt mechanism is responsible for handling the interrupts directly, or for passing interrupts to the operating system for it to handle. In guest mode, the interrupts also occur, and handling them via patched guest code results in significant performance gains.

In one implementation, the architecture provides a set of low-memory locations for each interrupt, referred to as interrupt vectors. When an interrupt occurs, the processor switches control to the specific interrupt vector, where the operating system has code installed to handle that interrupt. For example, if the Data Storage Interrupt (DSI) vector resides at memory location 0x300 and a DSI occurs, the processor would jump to location 0x0300 and execute the code at that location.

The present invention dynamically creates new high-performance, low-level kernel interfaces and patches the interrupts that are used by the guest mode code. Not all interrupts need to be patched, only that subset of the interrupts that are required to execute virtual machines. The interrupts comprise Data Storage Interrupts (DSI), Instruction Storage Interrupts (ISI), External Interrupts, Alignment Faults, Program Faults, Floating-Point Interrupts, VMX (Vector Register) Interrupts, Decrementer Interrupts, System Call Interrupts and Trace Interrupts. These specific interrupts directly affect the performance of virtual machine.

In order to patch the interrupt mechanism, a patching mechanism first determines whether the interrupt mechanism can be safely patched. If the patching mechanism determines that it can patch the interrupt mechanism, then it dynamically writes the patch and installs it, allowing creation of the virtual machine environment.

A first step of the patching mechanism determines whether or not the code that currently resides at the interrupt vectors is patchable. After the operating system installs this code, the patching mechanism queries the operating system and determines if it knows about the operating system version, and only patches if the version is recognized. A second step gathers information about the processor, which allows the patching mechanism to determine whether the processor's interrupt mechanism can be patched.

To patch the interrupt vectors, some numbers of instructions (e.g., four for each patched vector) are replaced with dynamically-created code that redirects the vector to a dynamically created dispatcher. This dispatcher then redirects the interrupt vector to an appropriate one of a set of newly created guest interrupt vectors for managing virtual machines. The size of this dispatcher is variable, depending on the processor and the exception vector being patched. Thus, a third step of the patching mechanism finds space for the dispatcher in space that is safe to run interrupts (interrupt-safe space), which in one implementation may be advantageously located within the interrupt vector address space (which is known as safe to execute in during interrupt processing time). To determine whether or not there is space available within the vector address space, the interrupt vectors are parsed, looking for an area large enough to hold the dispatcher.

A fourth step of the patching mechanism determines whether the interrupt vectors that are needed to run virtual machines are recognized as available to be patched. To this end, the patching mechanism performs code analysis on each interrupt vector, by looking for a certain set of instructions. For example, upon entry to an interrupt vector, the host kernel saves off a register into a special purpose register (SPRG). If the code analysis does not see this first instruction of the interrupt vector as being one that saves off a register to a SPRG, then this interrupt vector is not called at interrupt time and therefore this vector should not be patched.

If the patching mechanism completes its tests and the system meets the above-described requirements, then the interrupt mechanism is patched. To patch the interrupt mechanism, the dispatcher is written and placed in the space determined for it. The dispatcher is dynamically created depending on the type of processor and the information gathered about the current interrupt mechanism. After the dispatcher is created, each new interrupt vector is dynamically created in a memory location that is accessible at interrupt time. These new interrupt vectors have a common prologue that determines whether the interrupt vector is being called while a virtual machine is active. If a virtual machine is currently active, control is passed to our newly installed virtual machine manager. Otherwise, the original four instructions from the interrupt vector that was patched are executed, and when completed the flow branches back to the fifth instruction. These original four instructions are copied into the new interrupt vectors as part of patching, and modified, if necessary, to reflect their change in memory location for any relative branches that may be in the original four instructions.

After the new interrupt vectors are created, the new four instructions for each interrupt vector are created and written over their corresponding copied instructions. Each interrupt vector has a unique four instructions that allow the dispatcher to correctly dispatch the interrupt vector to the new interrupt vectors. These four instructions overwrite the copied instructions in the vector address space to complete the patching process.

This process of determining and patching the interrupt vectors is not persistent over powering down and powering up the hardware. Each time the microprocessor is powered up, the patching mechanism determines if the interrupt mechanism can be patched. The patch, dispatcher and newly created guest mode software are thus dynamic and may change depending on changes to the underlying hardware and host machine operating system. In order to optimize the dynamic code generation, code templates have been created to assist the creation of the guest mode software. These templates may or may not be used based on the information gathered about the processor and the underlying hardware interrupts.

Other advantages will become apparent from the following detailed description when taken in conjunction with the drawings, in which:

DETAILED DESCRIPTION

Exemplary Operating Environment

Figure 1:
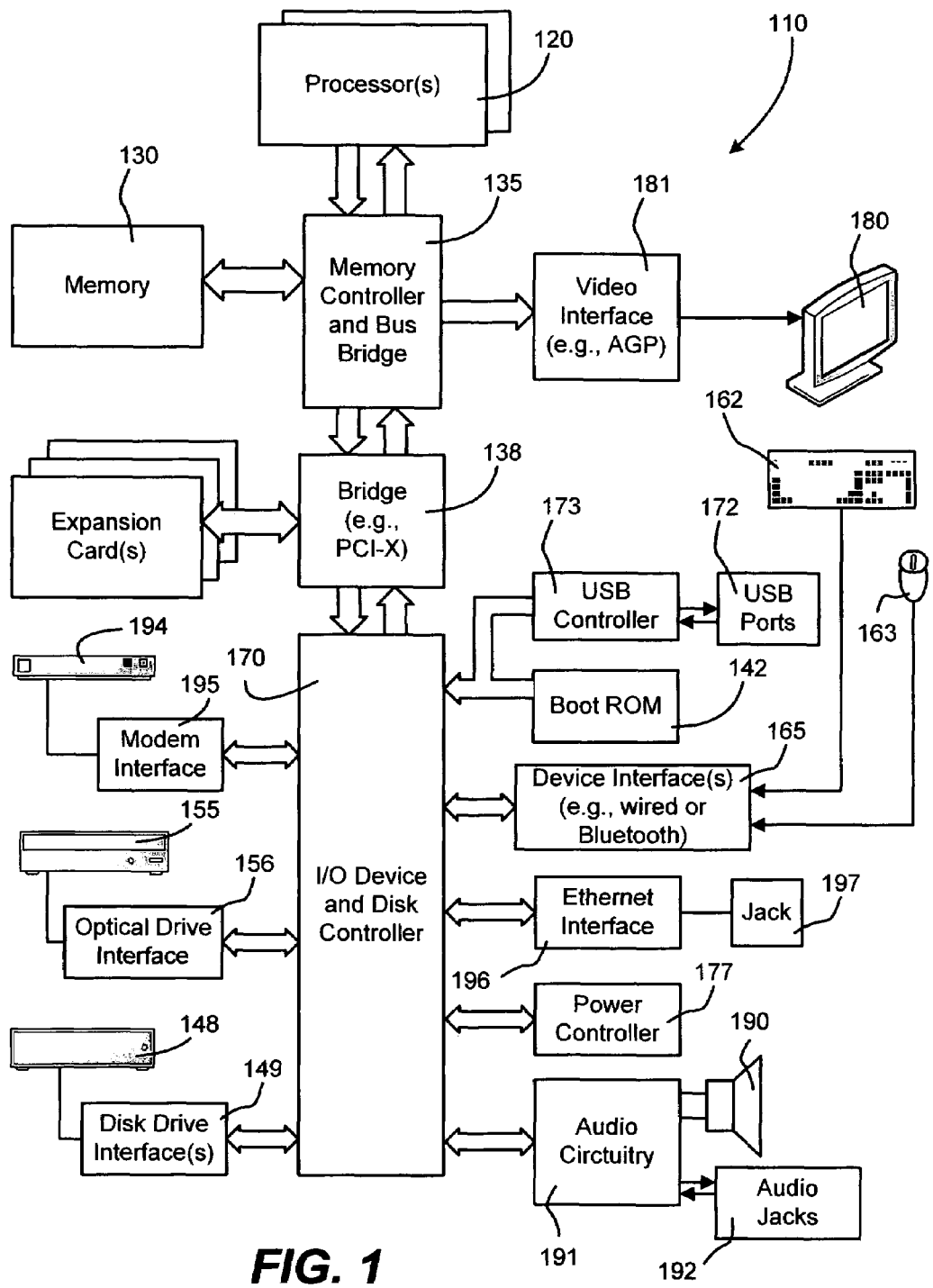
FIG. 1 is a block diagram generally representing a computer system into which the present invention may be incorporated.

FIG. 1 illustrates an example of a suitable computing system environment on which the invention may be implemented. The computing system environment is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120 containing one ore more processors, a system memory 130, and a bus structure (e.g., memory controller/bus bridge) 135 that couples various system components including the system memory to the processing unit 120. The bus structure 135 and/or other bus bridge mechanisms 138 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and/or PCI-X.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) and random access memory (RAM). A boot ROM 142, containing the basic routines that help to transfer information between elements within computer 110, such as during start-up, may be independently coupled to the system, as shown in FIG. 1. The memory typically contains data and/or program modules that are immediately accessible to and/or presently being operated on by the processing unit 120. By way of example, and not limitation, examples include a host operating system, a guest operating system, application programs, other program modules and program data.

The computer 110 may also include other removable/non-removable, volatile/nonvolatile computer storage media. By way of example only, FIG. 1 illustrates a hard disk drive 148 and interface 149 that reads from or writes to non-removable, nonvolatile magnetic media, an optical disk drive 155 and interface 156 that reads from or writes to a removable, nonvolatile optical disk such as a CD-ROM or DVD-ROM or other optical media. Other removable/non-removable, volatile/nonvolatile computer storage media that can be used in the exemplary operating environment include, but are not limited to, magnetic tape cassettes, flash memory cards, USB drives, digital versatile disks, digital video tape, solid state RAM, solid state ROM, and the like.

The drives and their associated computer storage media, discussed above and illustrated in FIG. 1, provide storage of computer-readable instructions, data structures, program modules and other data for the computer 110. For example, the hard disk drive 148 may store the host and guest operating systems, application programs, other program modules and program data. Note that these components may be the same as or different from those loaded in the memory 130, although they are typically different instances.

A user may enter commands and information into the computer 110 through input devices such as a keyboard 162 and pointing device 163 (e.g., a mouse), and/or via other well-known input means including a tablet, electronic digitizer, microphone, trackball or touch pad. Other input devices not shown in FIG. 1 may include a joystick, game pad, satellite dish, scanner, or the like. These and other input devices are often connected to the processing unit 120 through a wired and/or wireless input interface 165 that is coupled to the system such as via an I/O device and disk controller 170, but may be connected by other interface and bus structures, such as a parallel port, game port or a universal serial bus (USB) port 172 and its controller 173. Other mechanisms that may be connected to the controller 170 include a power controller 177.

A monitor 180 or other type of display device is also connected to the system bus 121 via an interface, such as a video interface 181. The monitor 180 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 190 connected via audio circuitry 191 and/or audio jacks 192 and/or a printer, which may be connected through an output peripheral interface or the like.

The computer 110 may operate in a networked environment using logical connections to one or more remote computers, which may be a personal computer, a server, a router, a network PC, a peer device or other common network node, and typically includes many or all of the elements described above relative to the computer 110. Such networks include a local area network (LAN) and a wide area network (WAN), which may be accessed via a modem 194 and modem interface 195 and/or an Ethernet interface 196 and jack 197 and/or, but may also include other networks. Such networking environments are commonplace in offices, enterprise-wide computer networks, intranets and the Internet. It will be appreciated that the network connections shown are exemplary and other means of establishing a communications link between the computers may be used.

Dynamically Patching an Operating System's Interrupt Mechanism

Various aspects of the present invention will be generally described with reference to the PowerPC Architecture, in which an interrupt mechanism is provided to allow the processor to change state as a result of external signals, errors, or unusual conditions arising from the execution of instructions. Further, the present invention will be described with reference to virtual personal computing technology in which multiple operating systems (e.g., Macintosh OS 10) and Microsoft Windows®-based operating systems may execute on the same processor. Notwithstanding, the present invention is not limited to any particular architecture, operating environment, platform and/or operating systems, but rather provides benefits and advantages in computing in general.

The interrupt mechanism is responsible for directly handling each interrupt, or passing the interrupt to the operating system for handling. In one example implementation described herein, the interrupt mechanism accomplishes this by defining a set of low-memory locations for each interrupt, referred to as interrupt vectors, generally represented by the vector space 202 in FIG. 2. Whenever an interrupt occurs, the processor switches control to the specific interrupt vector, where the operating system has (e.g., at boot time) installed code to handle that interrupt. For example, a reset interrupt has an interrupt vector at memory location 0x0100, while a Data Storage Interrupt (DSI) has an interrupt vector at memory location 0x0300. When a DSI occurs, the processor jumps to location 0x0300 and continues execution from that location. In many instances, the first instructions of each interrupt preserve some of the existing state, to free up registers needed for use by the remaining handling code. Then, a number representing the class of the interrupt is placed in a register so that an external (e.g., common) handling routine 203 (which also may free additional registers) can jump to an appropriate location for processing that particular interrupt, (also represented in FIG. 2 by the block labeled 203). In essence, the first instructions along with the common handling routine 203 normalize the environment for the interrupts. Note that the instructions need not jump to the common handling routine, but instead may jump to a different handling routine, also represented in FIG. 2 by the block labeled 203, (or if small enough may handle the interrupt directly).

In accordance with an aspect of the present invention and as described below, the interrupt mechanism is patched in the vector space 202. Patching the interrupt handling code directly at their vector space locations significantly improves performance when considered relative to the interfaces provided by the host operating system and also removes any dependency on virtual machine interfaces and related code (e.g., a Virtual Machine Manager) of the host operating system.

As can be readily appreciated, not all interrupts are necessarily used when running a virtual machine, and thus the present invention patches only a subset of the interrupts that are available. In one implementation, the interrupts that are used include Data Storage Interrupts (DSI), Instruction Storage Interrupts (ISI), External Interrupts, Alignment Faults, Program Faults, Floating-Point Interrupts, VMX (Vector Register) Interrupts, Decrementer Interrupts, System Call Interrupts and Trace Interrupts. These specific interrupts directly affect the performance of the virtual operating system while running a virtual machine.

Figure 2:
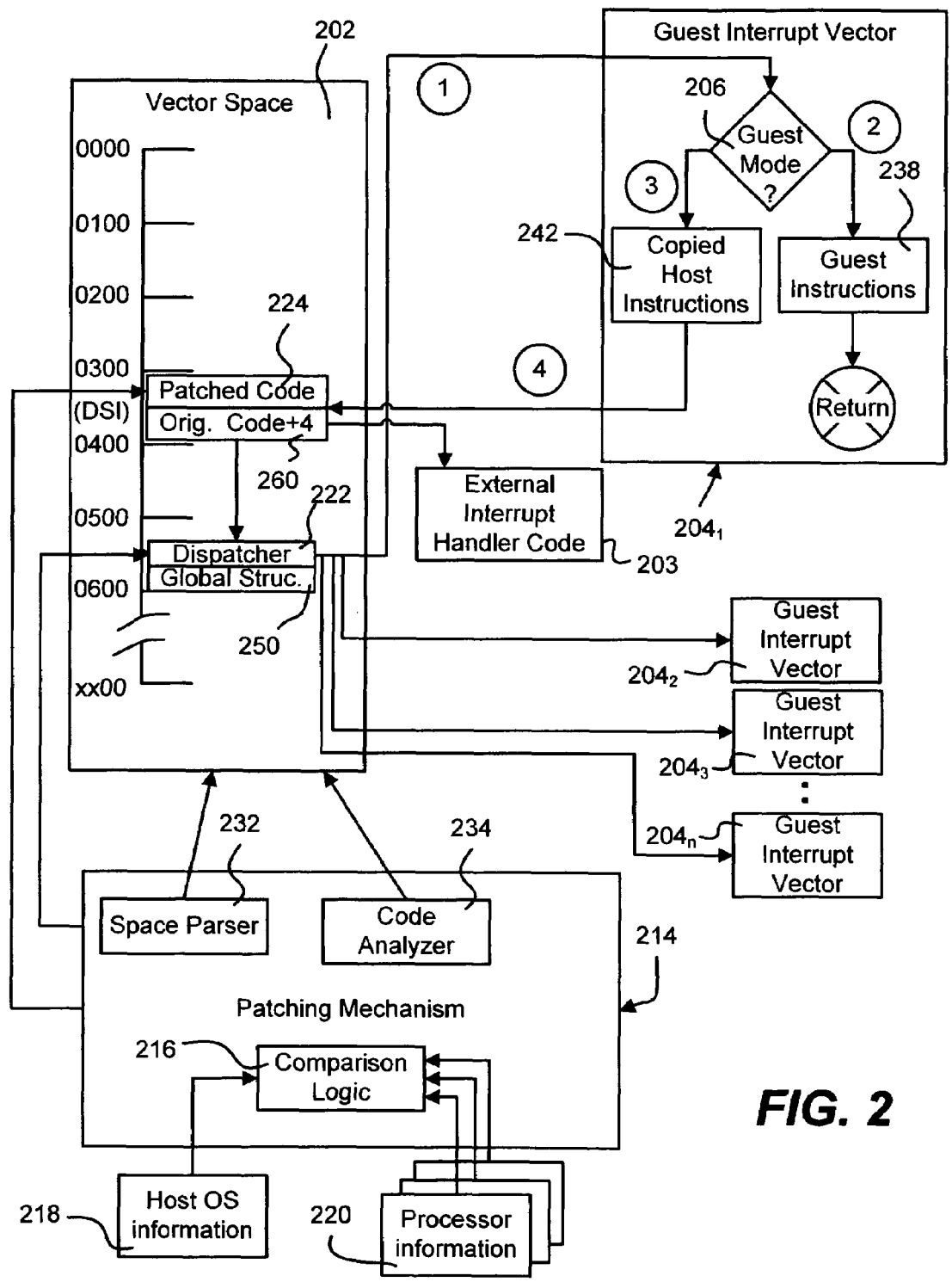
FIG. 2 is a block diagram representing various components in memory that are written as part of patching to handle interrupts, in accordance with an aspect of the present invention.

In accordance with an aspect of the present invention, the appropriate interrupt handlers in the vector space 202 are patched so that when the computer system is possibly running as a virtual machine, control is switched to the dynamically created virtual machine code instead of the host operating system code. As represented in FIG. 2 and as described below, the virtual machine code comprising a corresponding guest interrupt vector (e.g., $204_1$) performs a check 206 to determine whether the computer is running as a virtual machine, and if not, executes the host operating system code's instructions (that were copied as part of patching). Otherwise, the guest interrupt vector executes its own instructions. As the patching is done in a low-level language (e.g., assembler), the result is a highly-efficient interrupt handler, regardless of whether the device is running in host mode or guest (virtual machine) mode.

In order to patch the interrupt mechanism, a patching mechanism 214 (e.g., comprising one or more algorithms) determines whether the current interrupt mechanism can be safely patched. More particularly, one step of the patching mechanism's patching process determines whether the code that currently resides at the interrupt vectors is patchable. To this end, since the host operating system has installed this code, the algorithm queries the host operating system and determines if it recognizes the operating system version, as represented by the comparison logic 216 and host operating system information 218. If the logic 216 determines that the patching mechanism 214 can patch the interrupt mechanism, then the patching mechanism 214 writes the patch and installs, creating a Virtual Machine environment. If not, the patching mechanism 214 does not perform the patching operation, (and another virtual machine mechanism instead may be used). Note that instead of or in addition to version checking, other techniques are feasible for determining if code can be patched, such as to look for certain instructions at known locations, perform checksums or other signature-like functions, and/or use other processes to see if the code can be safely patched.

If the operating system code can be patched, the patching mechanism continues its process by gathering information about the processor, as represented by the processor information 220. For example, PowerPC processors have a processor revision register, which allows comparison logic 216 to determine whether the machine's processor interrupt mechanism can be patched.

If the machine's interrupt vectors can be patched, patching operates by replacing some of the instructions (e.g., the first four) of each interrupt vector with code that redirects the vector to a dispatcher 222 that has been created by the patching mechanism 214. For example, in FIG. 2 patched code 224 for handling a DSI is represented as starting at interrupt vector 0300 (hexadecimal); (other patches are not shown for purposes of clarity in FIG. 2). The dispatcher 222 redirects the interrupt vector to an appropriate one of the newly created interrupt vectors $204_1$-$204_n$ for managing virtual machines.

It should be noted that the process of determining and patching the interrupt vectors is not persistent over powering down and powering up the hardware. It is possible to get different code after a restart of a machine when the kernel extension (how the code is on the machine) is installed. Because of the possibility of one or more changes, each time the microprocessor is powered up, the patching mechanism of the present invention determines if the interrupt mechanism can be patched. The patch, dispatcher and newly created guest mode software are dynamic and may change depending on any changes to the underlying hardware and host machine operating system.

In order to optimize the dynamic code generation, code templates have been created to assist the creation of the guest mode software. These templates may or may not be used based on the information gathered about the processor and the underlying hardware interrupts.

As will become apparent, the memory size of the dispatcher 222 depends on the particular processor and the exception vectors that are being patched. For example, the following sample code provides alternative dispatcher templates depending on the type of processor (note that the link register, lr, is preserved and loaded with the guest vector address in the r13 register and then branched to):

```
EXT(new_vector_dispatcher):
    mtsprg 2, r11   // store off r11 register in special purpose reg
    mflr    r11     // move the link register (lr) -> r11
    mtlr    r13     // move r13 -> lr, because that is the new
                    // vector code
    blr
```

The following is an example template for a 64-bit machine (note that the link register is recomputed to contain the guest vector address based on the vector number, and then branched to):

```
EXT(new_syscall64_dispatcher):
nscd_dynop1:  ori   r13, r13, 0     // ori (OR=less cycles than add) in
                                    // the PatchInfoStruct.scratchRegister
                                    offset
nscd_dynop2:  stw   r11, 0(r13)     // use the scratch area, on 64 bit
                                    // machines this will be a std
              mflr  r11
nscd_dynop3:  nop                   // lwz r13, gExceptionPtr->vectorPatchAddress +
                                    // patch2size(0)
              addi  r13, r13, 0xC00 // add in the vector number.
              mtlr  r13
              blr
              nop                   // for alignment
```

Note that registers in a PowerPC-based architecture include special purpose registers (SPRGs), general-purpose registers (GPRs), floating-point registers (FPRs), at least one condition register (CR, split into bit fields that are used to indicate the result of certain operations), at least one floating point status and control register (FPSCR), at least one fixed-point exception register (XER), at least one link register (LR) which provides the branch target address, and a count register (CTR) that is used to hold a loop count that can be decremented in branch execution.

As a result of the differently-sized dispatchers and different vector environments, another step of the patching process is to find space for the dispatcher 222. More particularly, any area in memory that is close enough to the vector space and is safe at interrupt time (referred to herein as "interrupt-safe" memory) will suffice, so that the dispatcher code 222 can be safely executed during the time that interrupts are being processed.

One such area that is known to be safe is the interrupt vector address space 202, and one implementation thus scans through the interrupt vector area. In this implementation, to determine whether or not there is space available within the vector address space, the patching mechanism 214 includes a space parser 232 that parses the interrupt vectors, looking for an area large enough to hold the dispatcher 222. To this end, the parser may, for example, look for space following a return from interrupt (RFI) instruction but before the start of the next vector, and if found the patching mechanism 214 writes the dispatcher over the NOPs or otherwise unused space such as all zeroes or ones (which can also be tested for before overwriting) in a found location. If space for the dispatcher cannot be found, the patching mechanism 214 does not continue, (although as described above, other known interrupt-safe memory areas can be scanned before halting the patching process). Note that it is feasible to have more than one dispatcher, e.g., if enough space is available, each interrupt being patched could have its own dispatcher-like code, (although some patched vectors could share a dispatcher). However, as the dispatcher code is relatively fast, this is generally not necessary and in one preferred implementation, only one is used to avoid such complete analysis.

Another step in the patching process determines whether the interrupt vectors that are needed to run virtual machines are available to be patched. This is accomplished by performing code analysis on each interrupt vector, as represented in FIG. 2 by the code analyzer 234. For example, in a PowerPC architecture, each processor has scratch registers that are available only during interrupt vector processor time. These scratch registers are referred to as SPRGs (e.g., as shown in the dispatcher templates above; their usage is further defined in PowerPC Architecture documents).

Upon entry to an interrupt vector, the kernel first saves off a register into a SPRG, similar to how the dispatcher operates. If the code analyzer 234 does not see the first instruction of the interrupt vector as a saving of a register to a SPRG, then it makes the assumption that this interrupt vector is not called at interrupt time, and therefore this vector should not be patched.

If the interrupt vectors that are needed to run virtual machines on his processor meet the above requirements, then the interrupt mechanism is patched. To patch the interrupt mechanism, the dispatcher 222 is written and placed in the space that was previously found for it. The dispatcher 222 is dynamically created depending on the type of processor and the information gathered about the current interrupt mechanism. After the dispatcher 222 is created, each new interrupt vector, shown in FIG. 2 as guest interrupt vectors $204_1$-$204_n$, is created in a memory location that is accessible at interrupt time. Note that one of the difficulties is that jumps greater than a finite limit (e.g., 128 MB) cannot be automatically made. As such, one of the actions of the dispatcher is to fill the link register with the appropriate location.

Each of the new interrupt vectors have a common prologue that determines whether the interrupt vector is being called while a virtual machine is active. As described below, if upon an interrupt (and after patching) a virtual machine is currently active, control is passed to the corresponding newly installed virtual machine guest code interrupt vector. This is represented in FIG. 2 by the arrows labeled one (1) and two (2) to the guest mode decision diamond 206 to guest instructions 238. Otherwise, the original four instructions copied from the interrupt vector that was patched will be executed, as represented in FIG. 2 via the arrow labeled three (3) to the copied host instructions 242. Note that these original four copied instructions are modified, if necessary, to reflect their change in memory location for any relative branches that may be in the original four instructions.

After the new interrupt vectors are created, the new four instructions for each interrupt vector are created. Each interrupt vector has a unique four instructions that allow the dispatcher 222 to correctly dispatch the interrupt vector to the appropriate guest interrupt vectors and also transfer control to the dispatcher 222. These four instructions are then copied to low memory to complete the patching process.

The patching mechanism writes the code, instruction-by-instruction, to create the dispatcher 222, the guest interrupt vectors $204_1$-$204_n$ and the four instructions that are replaced in each patched interrupt vector, e.g., the patched code 224. To make the patching straightforward, the patching mechanism uses code templates, and then dynamically alters the templates based on the processor and currently installed interrupt mechanism.

The following is a sample of a guest interrupt vector:

```
EXT(new_vector_patch):
                mtlr    r11      // restore the old lr, which was saved in r11
                mfsprg  r13, 0   // get the per_proc area
nv_dynop1:      nop              // lwz r11, psa_diff(0)
                add     r13, r11, r13  // now r13 points to our psa_ext
                mfcr    r11      // save the condition register in r11
                stw     r11, psa_fSavedCR(r13)  // move the cr to saved area
                mfctr   r11
                stw     r11, psa_fSavedCTR(r13)
                lwz     r11, psa_fGuestMode(r13)
                cmpwi   r11, 1   // this modifies cr0
nv_dynop4:      li      r11, 0   // load in the vector number
                stw     r11, psa_fCurrentException(r13)
nv_dynop2:      nop              // This should be a beq EXT(toGuestVectorHandler)
                lwz     r11, psa_fSavedCTR(r13)
                mtctr   r11
                lwz     r11, psa_fSavedCR(r13)  // get saved cr from savedarea
nv_dynop5:      mfsprg  r13, 3   // restore r13
                mtcr    r11      // restore the cr
                mfsprg  r11, 2   // restore r11
new_vector_end:
                nop              // These four slots are for the "old" code that
                nop              // may be modified
                nop
                nop
nv_dynop3:      ba 0             // This should be ba to vector # + 4 instructions
```

Note that these are templates; when actually loaded, the NOPs and the instructions at the "dynop" labels may be overwritten (depending on the processor and the kernel) with appropriate instructions for the particular environment, e.g., the four copied instructions overwrite the four NOPs following the new_vector_end label. As can be seen from the above code, the link register is first restored, so that the return will be back to the vector space. Also, the compare instruction is testing whether the system is in guest mode or not, which is per-processor, hence the per-processor data is obtained for the comparison. If so, the address of the corresponding guest interrupt vector is computed, then execution transferred to that address, followed by cleanup to restore the registers. If not in guest mode, the branch absolute (ba) is back to the fifth instruction, (that is, to the vector number plus four instructions, assuming four were patched over as in this example implementation), as represented in FIG. 2 via the arrow labeled four (4) to the original code plus four instructions, block 260.

The following tables contain example (common) four instructions for each interrupt vector on different types of systems, which are examples of the patched instructions to the dispatcher, after the original instructions are copied (note that the NOP is overwritten with the relative adjusted instruction, and the instructions at the "dynop" labels may be overwritten depending on the processor and the kernel):

```
EXT(common_vector_code):

cv_dynop4:      mtsprg   3, r13             // store off r13 cv_dynop1:      nop                         // lwz r13, gExceptionPtr-
                                            // >vectorPatchAddress + patch2size(0)

cv_dynop2:      addi     r13, r13, 0x200    // add in the vector number cv_dynop3:      b        EXT(new_vector_dispatcher)   // ba gExceptionPtr-
                                                      // >vectorPatchAddress
```

In a sixty four bit environment:

```
EXT(syscall64_common_code):
cv_dynop4:   mtsprg    3, r13    // store off r13
cv_dynop1:   mfsprg    r13, 0    // lwz r13, gExceptionPtr-
                                 // >vectorPatchAddress + patch2size(0)
cv_dynop2:   rlwinm    r13, r13, 0, 27, 28  // mask out the index into the
                                 // scratch space; this is calculated by
                                 // figuring out the size of the perProcArea
cv_dynop3:   b         EXT(new_syscall64_dispatcher)
```

The following shows a patch global structure 250 that is placed after the dispatcher code, providing a pointer to a per-processor work area that the dispatcher uses, including to determine which processor is being interrupted and thus which guest work area to use. In other words, this pre-computed information, including the index into a guest per-processor work area as derived based on the kernel host per-processor information (number of processors and offset between each sprg0), is thus preserved for quickly accessing the correct work area for each given processor.

```
typedef struct PatchInfo
{
    // scratch register for interrupt mechanism, with no sprgs free upon
    // interrupt vector entry
        unsigned long   fPatchScratchRegister
                        [ kNumberOfSupportedCPUS ];
        unsigned long   fPatchScratchRegisterLower
                        [ kNumberOfSupportedCPUS ];
    // This is the PHYSICAL address of our exception patch
        unsigned long   fExceptionPatch_physAddr;
    // This is the difference between the start of the per_proc_info
        unsigned long   fPSAdifference_physical;
} PatchInfoStruct;
```

Figure 3:
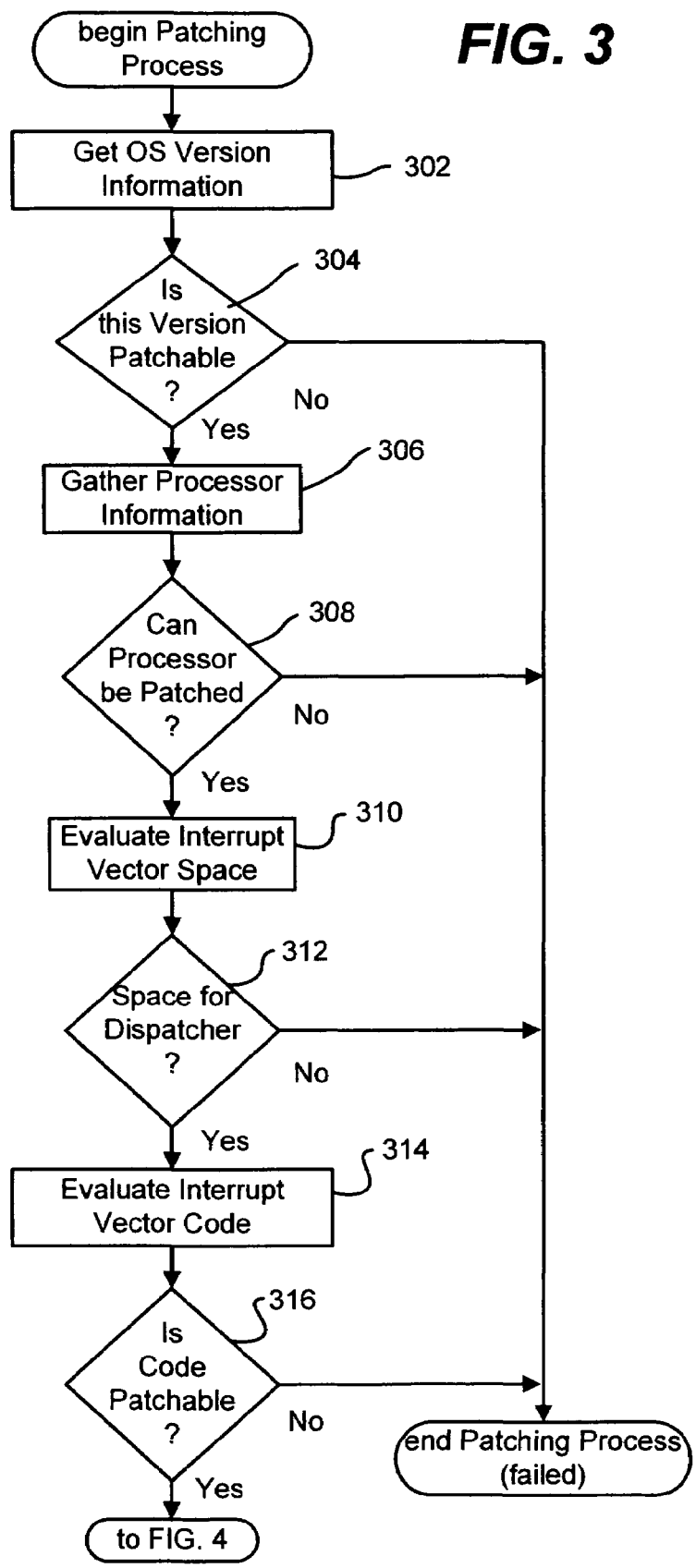
FIG. 3 is a flow diagram representing tests performed to validate that patching is acceptable, in accordance with an aspect of the present invention.
Figure 4:
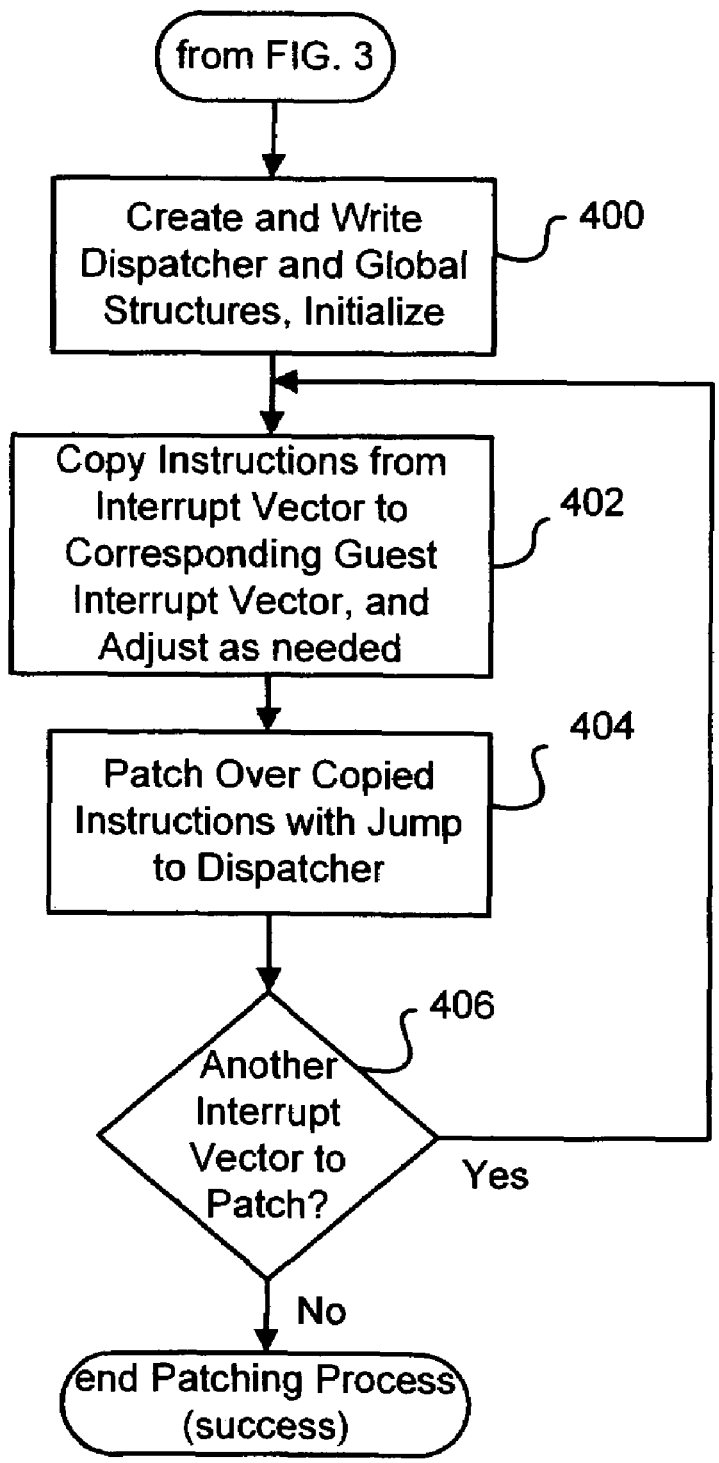
FIG. 4 is a block diagram representing the patching operations, in accordance with an aspect of the present invention.
Figure 5:
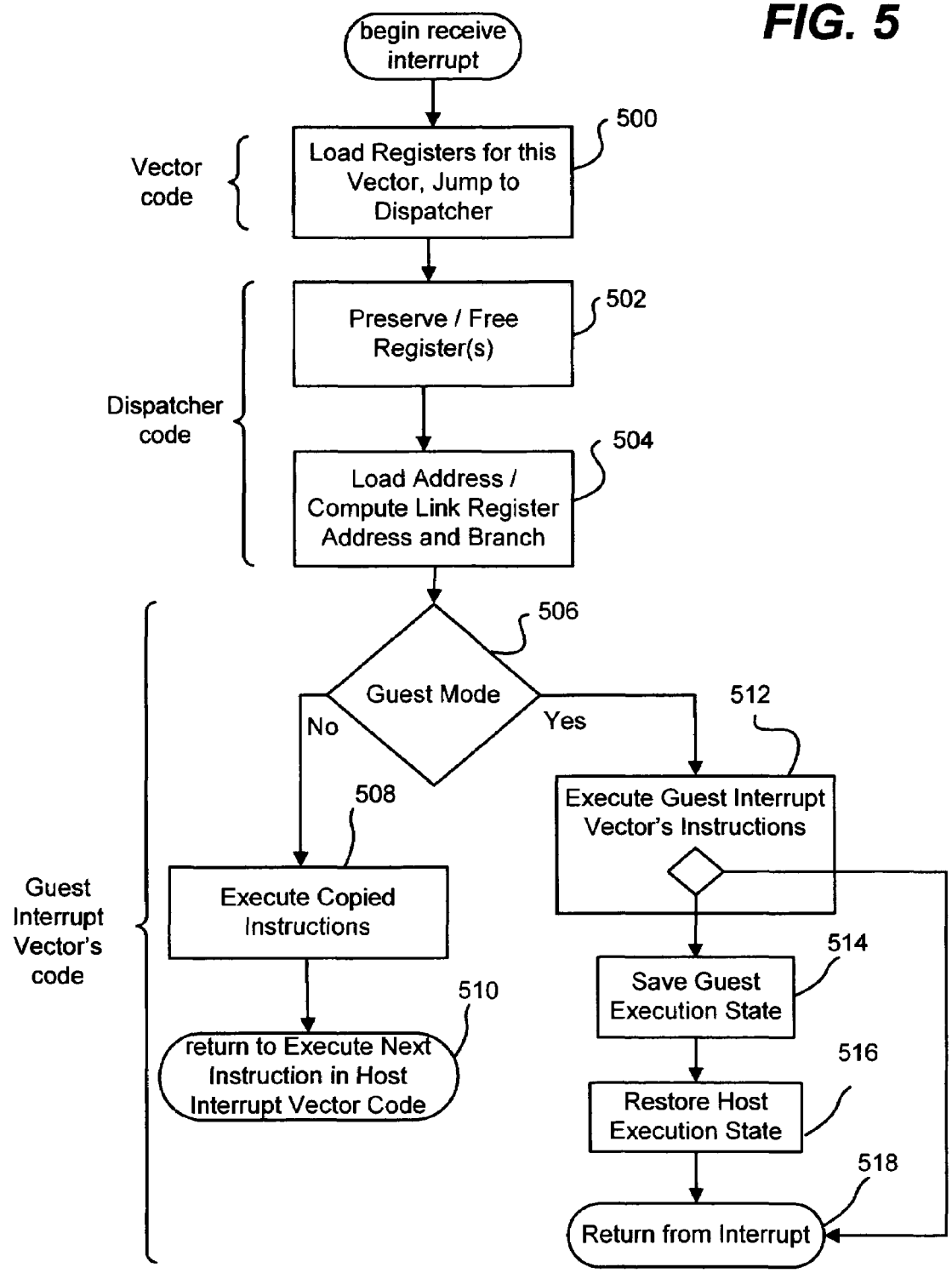
FIG. 5 is a flow diagram representing the flow of control through the components, after patching, to handle an interrupt mode in accordance with an aspect of the present invention.

Turning to a summary of the operation of the present invention, FIGS. 3 and 4 are flow diagrams representing the general flow of operation performed by the patching mechanism, while FIG. 5 is an overview of how an interrupt is handled after patching has completed. It should be noted that the order of performing the patching operations is mostly unimportant, as the tests each need to be passed, and the data to be written can be written in any order that does not overwrite code that is still needed, e.g., the original instructions need to be copied before overwriting them.

In FIG. 3, beginning at step 302, the operating system version information is retrieved and tested at step 304, failing the process if not recognized as suitable for patching. Note that another type of virtual machine mechanism may be used, such as one that depends on the host operating system interfaces.

If the host operating system is patchable, steps 306 and 308 represent the gathering and evaluating of the processor information, to determine if this machine's processor or processors can be patched. Again, any failure aborts the patching process.

Steps 312 and 314 represent the analyzing of space in the interrupt vector space for the dispatcher and global structures. If not found, patching is not performed, otherwise the patching process continues to see if the code is such that it can be patched.

More particularly, it is possible that changes to the operating system may have taken place. If the instructions to be patched do not match a familiar (or possibly anticipated) pattern, the patching does not occur. If recognized, the patching process continues to FIG. 4 to begin patching. Note that other tests are feasible to ensure that patching will be successful.

FIG. 4 begins at step 400, which represents creating and writing the dispatcher and the global structures, including performing the calculations that initialize them. For efficiency, as much pre-configuration as possible is performed in advance, rather than being recalculated at interrupt time. Note that although not shown, patching requires that each other processor be halted, which operating systems provide a mechanism to do. Note that for efficiency patching is only done once, such as after each reboot, and thus efficiency is not a concern, as it is for later handling the many interrupts with the patched code.

Step 402 represents the copying of the instructions (e.g., four) from the interrupt vector to the corresponding guest interrupt vector, and adjusting any addresses as needed to compensate for the new location. Step 404 represents the patching of new instructions by overwriting those which were copied. Note that as described above, these instructions load up information needed by the dispatcher to appropriately branch, as well as to transfer control to the dispatcher.

Step 406 repeats the process by returning to step 402 until the full set of necessary interrupt vectors have been patched.

FIG. 5 represents the handling of an interrupt once patching is complete. As can be seen, step 500 represents performing the instructions that overwrote the copied instructions at step 404, resulting in the dispatcher being executed with the appropriate information for this vector at steps 502 and 504. As described above, the dispatcher preserves the contents of the registers that it needs to branch (e.g., the link register) and loads/computes the address of the guest vector to which it then branches.

Step 506 represents the guest interrupt vector's code testing for whether the particular processor is operating in guest mode. If not, the original four host interrupt vector instructions are executed at step 508 before returning to the next host interrupt vector instruction, at step 510.

Otherwise, steps 512, 514, 516 and 518 are executed. Step 512 executes the guest interrupt vector's instructions, which includes code that determines whether it should continue in guest mode by branching to step 518 to return from the interrupt (RFI), or save the guest's execution state at step 514 and then restore the host's execution state at step 516 before returning from the interrupt at step 518. For example, the guest's Decrementer interrupt returns to the host's Decrementer interrupt, whereas the DSI does not, and thus the operations depend on the particular interrupt.

As can be seen from the foregoing detailed description, there is provided a method and system for patching interrupt vectors to facilitate a virtual machine. The patching achieves significant performance gains in the guest operating system while reducing or eliminating dependencies on the device manufacturer's host operating system code. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system having a processor and multiple operating systems, where the processor runs in host mode when executing a native operating system and runs in guest mode when executing a secondary operating system, a method comprising:
    patching at least one instruction in interrupt vector space to branch to dynamically-created guest mode code;
    receiving an interrupt; and
    handling the interrupt, including determining whether a processor corresponding to the interrupt is running in host mode or guest mode, wherein host mode corresponds to executing a native operating system and guest mode corresponds to executing a secondary operating system; and
        1) when the processor is running in guest mode, executing a first set of guest mode code in the interrupt vector space; and
        2) when the processor is running in host mode, executing a second set of guest mode code, the second set correspond to at least one host mode code instruction that was copied from the interrupt vector space and patched.

2. The method of claim 1 wherein patching to branch to dynamically-created guest mode code comprises dynamically generating a dispatcher and writing the dispatcher into the interrupt vector space.

3. The method of claim 2 further comprising, finding available memory in the interrupt vector space for writing the dispatcher.

4. The method of claim 2 further comprising, dynamically constructing the dispatcher based on processor information.

5. The method of claim 4 wherein constructing the dispatcher based on processor information comprises selecting a template corresponding to a processor type.

6. The method of claim 1 wherein patching to branch to guest mode code comprises overwriting host mode interrupt code in the interrupt vector space to branch to the dispatcher.

7. The method of claim 1 further comprising, validating that the computer system is suitable for patching.

8. The method of claim 7 wherein validating that the computer system is suitable for patching comprises determining whether the operating system version corresponds to one that is known to be patchable.

9. The method of claim 7 wherein validating that the computer system is suitable for patching comprises determining whether at least one processor is known to be patchable.

10. The method of claim 7 wherein validating that the computer system is suitable for patching comprises determining whether there is sufficient space available in the interrupt vector space for a dispatcher.

11. The method of claim 7 wherein validating that the computer system is suitable for patching comprises determining whether code to be patched in the interrupt vector space corresponds to at least one recognized instruction.

12. The method of claim 1 further comprising, initializing a global structure in interrupt vector space.

13. The method of claim 1 further comprising, copying an instruction set comprising at least one instruction from the interrupt vector space to guest mode code space.

14. The method of claim 13 wherein copying the instruction set comprises overwriting code in a template based on a current computing environment.

15. The method of claim 13 wherein patching at least one instruction in interrupt vector space to branch to guest mode code includes overwriting the copied instruction set with patching code.

16. The method of claim 15 further comprising, executing the patching code in the interrupt vector space to handle the interrupt.

17. The method of claim 1 wherein patching at least one instruction in interrupt vector space to branch to guest mode code includes writing code that computes an address, writing the address into a register, and executing an instruction to branch to the contents of the register.

18. One or more computer-readable storage media having computer-executable instructions which when executed by a computer system having a processor and multiple operating systems, where the processor runs in host mode when executing a native operating system and runs in guest mode when executing a secondary operating system cause the computer system to perform a method comprising:
    patching at least one instruction in interrupt vector space to branch to dynamically created guest mode code;
    receiving an interrupt; and
    handling the interrupt, including determining whether a processor corresponding to the interrupt is running in host mode or guest mode, wherein host mode corresponds to executing a native operating system and guest mode corresponds to operating a secondary operating system; and
        1) when the processor is running in guest mode, executing a first set of guest mode code in the interrupt vector space; and
        2) when the processor is running in host mode, executing a set of guest mode code, the second set correspond to at least one host mode code instruction that was copied from the interrupt vector space and patched.

19. In a computing device having a processor and multiple operating systems, where the processor runs in host mode when executing a native operating system and runs in guest mode when executing a secondary operating system, a system comprising:
    a patching mechanism, including at least one component in the patching mechanism that determines whether the computing device is suitable for patching; and
    a set of at least one guest interrupt vectors, each guest interrupt vector being written to memory by the patching mechanism when the device is suitable for patching, the patching mechanism dynamically creating patching code and writing the dynamically-created patching code in interrupt vector space to branch to a corresponding guest interrupt vector when an interrupt is received.

20. The system of claim 19 further comprising a dispatcher, wherein upon receiving an interrupt, the dispatcher is dynamically constructed and written into the interrupt vector space, and wherein the patching code in the interrupt vector space branches to the corresponding guest interrupt vector by branching to the dynamically-constructed dispatcher in the interrupt vector space.

21. The system of claim 20 wherein the patching mechanism writes the dispatcher into interrupt-safe space.

22. The system of claim 21 wherein the patching mechanism finds available memory in the interrupt vector space for writing the dispatcher.

23. The system of claim 21 wherein the patching mechanism writes the further patching code in the interrupt vector space to branch to the dispatcher.

24. The system of claim 21 wherein the patching mechanism dynamically constructs the dispatcher based on processor information.

25. The system of claim 24 wherein the patching mechanism selects a template corresponding to a processor type to dynamically construct the dispatcher.

26. The system of claim 19 wherein each guest interrupt vector includes a mode evaluation mechanism that determines whether a processor of the computing device that corresponds to the interrupt is operating in guest mode.

27. The system of claim 26 wherein the patching mechanism copies instructions from the interrupt vector space into a corresponding guest interrupt vector, and wherein the mode evaluation mechanism causes the copied instructions to be executed when the processor is not in guest mode.

28. The system of claim 19 wherein the patching mechanism copies instructions from the interrupt vector space into a corresponding guest interrupt vector by dynamically overwriting code in a template based on a current computing environment.

29. The system of claim 19 wherein the component in the patching mechanism that determines whether the computing device is suitable for patching determines whether the operating system version corresponds to one that is known to be patchable.

30. The system of claim 19 wherein the component in the patching mechanism that determines whether the computing device is suitable for patching determines whether at least one processor is known to be patchable.

31. The system of claim 19 wherein the component in the patching mechanism that determines whether the computing device is suitable for patching determines whether there is sufficient space available in the interrupt vector space for a dispatcher.

32. The system of claim 19 wherein the component in the patching mechanism that determines whether the computing device is suitable for patching determines whether code to be patched in the interrupt vector space corresponds to at least one recognized instruction.

33. The system of claim 19 further comprising a global structure in interrupt vector space.

34. At least one computer-readable storage medium having computer-executable instructions which when executed perform steps, comprising: validating that a computer system is suitable for having dynamically generated guest mode code patched into interrupt vector space;
dynamically generating a dispatcher and writing the dispatcher into the interrupt vector space;
patching at least one instruction in the interrupt vector space to branch to the dynamically-generated guest mode code that handles interrupts, the dynamically-generated guest mode code being written into the interrupt vector space, and the dynamically-generated guest mode code determining whether a processor corresponding to each interrupt is running in host mode or guest mode, wherein host mode corresponds to the processor executing a native operating system and guest mode corresponds to the processor executing a secondary operating system; and
executing a first set of guest mode code when the processor is executing the native operating system and executing a second set of guest mode code when the processor is executing the secondary operating system.

35. The computer-readable storage medium having computer-executable instructions of claim 34 wherein the interrupt vector space is interrupt-safe space.

36. The computer-readable storage medium of claim 35 having further computer-executable instructions comprising, dynamically constructing the dispatcher based on a current computing environment.

37. The computer-readable storage medium having computer-executable instructions of claim 35 wherein patching at least one instruction in interrupt vector space further comprises writing at least one instruction in interrupt vector space to branch to the dispatcher.

38. The computer-readable storage medium having computer-executable instructions of claim 35 wherein writing the dispatcher comprises selecting a template corresponding to a current computing environment.

39. The computer-readable storage medium having computer-executable instructions of claim 34 wherein validating that the computer system is suitable for being patched comprises determining whether there is sufficient space available in the interrupt vector space for writing the dispatcher.

40. The computer-readable storage medium having computer-executable instructions of claim 34 wherein validating that the computer system is suitable for being patched comprises determining whether the operating system version corresponds to one that is known to be patchable.

41. The computer-readable storage medium having computer-executable instructions of claim 34 wherein validating that the computer system is suitable for being patched comprises determining whether at least one processor is known to be patchable.

42. The computer-readable storage medium having computer-executable instructions of claim 34 wherein validating that the computer system is suitable for being patched comprises determining whether code to be patched in the interrupt vector space corresponds to at least one recognized instruction.

43. The computer-readable storage medium having computer-executable instructions of claim 34 wherein patching at least one instruction in interrupt vector space to branch to the guest mode code comprises copying an instruction set comprising at least one instruction from the interrupt vector space to guest mode code space, and overwriting the copied instruction set with new branching code.

44. The computer-readable storage medium of claim 34 having further computer-executable instructions comprising, writing the guest mode code by overwriting code in a template based on a current computing environment.

* * * * *

UNITED STATES PATENT AND TRADEMARK OFFICE
CERTIFICATE OF CORRECTION

PATENT NO.         : 7,373,446 B2                                                Page 1 of 1
APPLICATION NO.    : 10/982081
DATED              : May 13, 2008
INVENTOR(S)        : Post et al.

It is certified that error appears in the above-identified patent and that said Letters Patent is hereby corrected as shown below:

In column 16, line 18, in Claim 18, delete "system" and insert -- system, --, therefor.

In column 16, line 21, in Claim 18, delete "dynamically created" and insert -- dynamically-created --, therefor.

In column 16, line 33, in Claim 18, after "a" insert -- second --.

In column 16, line 66, in Claim 23, after "the" delete "further".

Signed and Sealed this
Third Day of May, 2011

David J. Kappos
*Director of the United States Patent and Trademark Office*